United States Patent [19]
Langhals

[11] Patent Number: 5,508,137
[45] Date of Patent: Apr. 16, 1996

[54] PERYLENE AMIDINE IMIDE DYES, A PROCESS FOR PREPARING THEM, AND THEIR USE

[75] Inventor: Heinz Langhals, Ottobrunn, Germany

[73] Assignee: Ciba-Geigy Corporation, Tarrytown, N.Y.

[21] Appl. No.: 287,400

[22] Filed: Aug. 8, 1994

[30] Foreign Application Priority Data

Aug. 13, 1993 [CH] Switzerland .............................. 2413/93

[51] Int. Cl.⁶ .............................. G03G 5/04; C09B 5/62
[52] U.S. Cl. .............................................. 430/78; 564/426
[58] Field of Search ...................... 430/74, 76, 78; 564/426, 427, 429; 546/52

[56] References Cited

U.S. PATENT DOCUMENTS

| | | | |
|---|---|---|---|
| 4,336,383 | 6/1982 | Vorozhtsov et al. | 546/52 |
| 4,556,622 | 12/1985 | Neumann et al. | 430/58 |
| 4,714,666 | 12/1987 | Wiedemann et al. | 430/59 |
| 4,968,571 | 11/1990 | Gruenbaum et al. | 430/58 |
| 5,019,473 | 5/1991 | Nguyen et al. | 430/58 |
| 5,389,477 | 2/1995 | Tsuchiya et al. | 430/78 |

FOREIGN PATENT DOCUMENTS

| | | |
|---|---|---|
| 0143979 | 6/1985 | European Pat. Off. . |
| 0447826 | 9/1991 | European Pat. Off. . |
| 3017935 | 11/1980 | Germany . |
| 3209424 | 3/1981 | Germany . |
| 4037735 | 6/1992 | Germany . |
| 2051110 | 1/1981 | United Kingdom . |

OTHER PUBLICATIONS

C.A. 117: 173379t, 1992.
CA 108: 96162.
Chem. Ber. 1988, 121, 225.
Journal of Prakt. Chemie. Band 333, Heft. 15, 1991 pp. 733–748.
CA: 97: 129104.
Chem. Ber. 115, 2927–2934 (1982).
CA 99: 196623.
Chem. Ber. 116, 3524–3528 (1983).
CA 114: 145431.
Bull. Chem. Soc. Jpn. 25, 411 (1952).
Chemistry Letters, pp. 151–154 (1979).
CA 99: 39794.
Dyes and Pigments 4 (1983) 171–177.
Dyes & Pigments 5 (1984) 171–188.
CA 119: 71954.
Angew. Chem. 1993, 105, 537.
Chem. Ber. 1991, 124, 529.

*Primary Examiner*—John Goodrow
*Attorney, Agent, or Firm*—Michele A. Kovaleski

[57] ABSTRACT

Certain perylene-3,4:9,10-tetracarboxylic monoanhydride monoimides are condensed with primary diamines or with imidazoles. The products obtained are amidine imides of the formula I

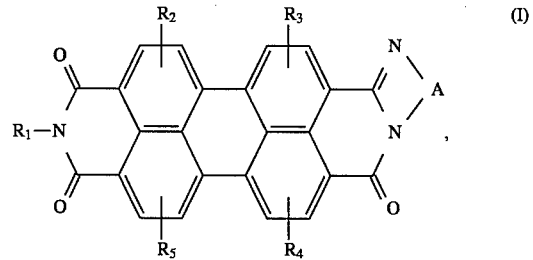

where, for example, $R_1$ is 1-hexylheptyl, $R_2$ to $R_5$ are each H and A is 1,2-phenylene. Compounds of the formula I are very light-fast dyes which show strong fluorescence in solution and whose fluorescence occurs at a longer wavelength than that of the bisimides (perylene dyes). The perylene amidine imides of the invention are suitable for example for use as colorants for the mass coloration of macromolecular organic material, as fluorescent dyes or as photoconductors.

13 Claims, No Drawings

PERYLENE AMIDINE IMIDE DYES, A PROCESS FOR PREPARING THEM, AND THEIR USE

The invention relates to certain perylene amidine imides substituted by secondary alkyl radicals or by alkyl-substituted phenyl radicals on the imide nitrogen, to a process for preparing them by reacting the corresponding N-substituted perylene-3,4:9,10-tetracarboxylic monoanhydride monoimides with diamines, and to their use, for example for the mass coloration of macromolecular organic material, as fluorescent dyes or as photoconductors.

The well known, sparingly soluble perylene dyes, perylene-3,4:9,10-tetracarboxylic bisimides, 2, are readily available from the commercially obtainable perylene-3,4:9,10-tetracarboxylic bisanhydride 1 and are chiefly used as pigments.

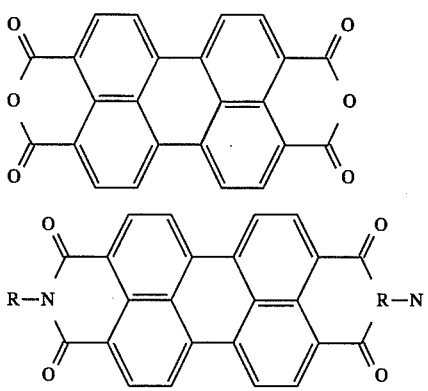

However, this chromophore can also serve as the basis for very light-fast fluorescent dyes when the two nitrogen atoms of the imide groups are provided with solubility-enhancing substituents R, e.g. 2,5-di-tert-butylphenyl or 1-hexylheptyl (see for example S. Demmig, H. Langhals, Chem. Ber. 1988, 121, 225; H. Langhals, S. Demmig, T. Potrawa, Journal f. prakt. Chemie, 1991, 333, 733). Whereas many properties of perylene dyes, such as the solubility in organic solvents, can be widely influenced through the radicals R, a change in the UV/VIS spectra is hardly possible in this way (A. Rademacher, S. Märkle, H. Langhals, Chem. Ber. 1982 115, 2927). True, a ring substitution of the dyes is possible in principle, but this frequently presents problems on account of steric interactions.

A further way of altering the spectra is to replace carbonyl groups on the perylene dyes with the related imino groups. Replacing a carbonyl group in each of the two carboximide rings does indeed lead to dyes whose absorption is shifted towards longer wavelengths, but the solubility in organic solvents is comparatively low and their fluorescence quantum yields are less than those of the perylene dyes (I. Lukac, H. Langhals, Chem. Ber. 1983, 116, 3524).

Key compounds for the preparation of the dyes mentioned are the perylene-3,4:9,10-tetracarboxylic 3,4-anhydride 9,10-imides 3

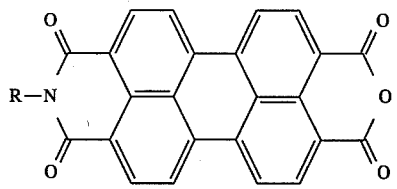

which a new method makes available through a partial, alkaline hydrolysis of the bisimides (H. Kaiser, J. Lindner, H. Langals, Chem. Ber. 1991, 124, 529). The latter technique also permits the introduction of solubility-enhancing radicals, as of 1-hexylheptyl.

The present invention accordingly provides perylene amidine imides of the formula I

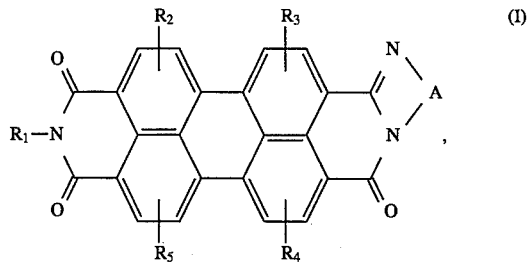

where $R_1$ is a secondary $C_7$–$C_{41}$ alkyl radical or a radical of the formula II

where R is a branched $C_3$–$C_8$ alkyl radical and m is 1, 2 or 3;

A is $C_5$–$C_7$ cycloalkylene, phenylene, naphthylene, pyridylene, a more highly fused aromatic carbocyclic or heterocyclic radical or a bivalent radical of the formula III, IV or V

or

and $R_1$ and A may each be substituted by halogen, alkyl, cyano or nitro; $R_2$ to $R_5$ are each independently of the others hydrogen, alkyl, aryl, hetaryl, halogen, cyano, nitro, —$OR_8$, —$COR_8$, —$COOR_8$, —$OCOR_8$, —$CONR_8R_9$, —$OCONR_8R_9$, —$NR_8R_9$, —$NR_8COR_9$, —$NR_8COOR_9$, —$NR_8SO_2R_9$, —$SO_2R_8$, —$SO_3R_8$, —$SO_2NR_8R_9$ or —N=N—$R_8$; and $R_6$ to $R_9$ are each independently of the others $C_1$–$C_4$ alkyl, phenyl or 4-tolyl.

The compounds of the invention are dyes having novel chromophores which, compared to perylenetetracarboxylic bisimides, absorb at longer wavelength and are strongly fluorescent. Compared with the perylenetetracarboxylic bisamidine derivatives known from Chem. Ber. 1983, 116, 3524, which were mentioned at the beginning, the novel amidine imides have significantly higher fluorescence quantum yields. In addition, in the compounds of the invention, the absorption maximum can be controlled as desired by varying the A radical. The amidine imides of the formula I are notable for a solubility in organic solvents which is high for this type of compound and for quite excellent light fastness.

A few perylenetetracarboxylic amidine imides have been mentioned in the literature. For instance, T. Maki and H. Hashimoto in Bull. Chem. Soc. Jpn. 1952, 25, 411, describe the condensation of perylenetetracarboxylic bisanhydride with o-phenylenediamine, which, besides other products, also produces a perylenetetracarboxylic amidine imide (having a 2-aminophenyl substituent on the imide nitrogen). This product is used as a vat dye. It is also sated that this product is only sparingly soluble in organic solvents and weakly fluorescent.

U.S. Pat. No. 4,336,383 describes certain 1,1'-binaphthyl-4,4',5,5',8,8'-hexacarboxylic acid derivatives which are likewise used as vat dyes. The binaphthyl derivatives are treated with reducing agents and then oxidized to form corresponding perylenetetracarboxylic amidine imides on the textile fibre. It is mentioned that these insoluble amidine imides can also be synthesized outside the dyebath and can be used as pigments.

Y. Nagao, T. Misono, N. Ishikawa and Y. Tanabe describe in Chemistry Letters, 1979, 151 and in Dyes and Pigment, 1984, 5, 171, the synthesis of asymmetrical N-alkyl-N'-aryl-3,4:9,10-perylenedicarboximides by condensation of N-alkyl-3,4:9,10-perylenetetracarboxylic monoanhydride monoimides with arylamines. They also describe the reaction with o-phenylenediamine, which produces N-alkylperylenetetracarboxylic amidine imides having short-chain, primary alkyl substituents on the imide nitrogen, and also the UV spectra of the last-mentioned compounds in concentrated sulfuric acid. There is no mention of any fluorescence of these compounds.

U.S. Pat. Nos. 4,714,666, 4,968,571 and 5,019,473 describe the use of certain perylene pigments as photoconductors in electrophotography. The perylene pigments mentioned for use also include perylenetetracarboxylic amidine imides having a methyl, benzyl or phenylethyl substituent on the imide nitrogen.

The perylene amidine imides of the formula I according to the invention can be prepared by reacting a perylene-3,4:9,10-tetracarboxylic monoanhydride monoimide of the formula VIII

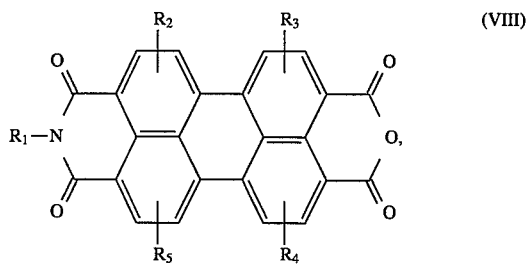

with a primary diamine of the formula IX

$H_2N-A-NH_2$          (IX), or for compounds of the formula I where A is a bivalent radical of the formula III by reacting the monoanhydride monoimide of the formula VIII with a substituted or unsubstituted imidazole, where, in the formulae VIII and IX, $R_1$ and A are each as defined above, with the proviso that A is not a radical of the formula III.

Perylene-3,4:9,10-tetracarboxylic monoanhydride monoimides of the formula VIII are known for example from the paper by H. Tröster in Dyes and Pigments, 1983, 4, 171 or from the abovementioned Chem. Ber. 1991, 124, 529 paper, or they can be prepared in an analogous manner.

The solubility-enhancing group used in the synthesis can be for example the very effective 1-hexylheptyl radical or some other above-defined radical $R_1$. The syntheses, workups and spectroscopic characterizations of the dyes can be quite significantly facilitated thereby. For instance, N,N'-di(1-hexylheptyl)perylene-3,4:9,10-tetracarboxylic bisimide (2a) can be partially hydrolysed with KOH in tert-butyl alcohol, so that acidification gives the monoanhydride (3a). The workup procedure can be significantly improved as follows so that customary chromatography columns (diameter 4 cm) yield 30 g or more of ultrapure dye in a single pass without problems: the crude reaction product of the hydrolysis, which contains the bisimide (2a), the monoanhydride monoimide (3a) and the bisanhydride (1) of perylenetetracarboxylic acid as well as by-products, is applied for example with chloroform to silica gel. By-products and the excess bisimide are completely washed out of the column with chloroform—the latter can accordingly also be recovered. Then 10% glacial acetic acid is added to the chloroform eluent, and the monoanhydride monoimide is obtained as a pure fraction. The bisanhydride and small proportions of macromolecular compounds remain on the column.

To prepare a monoimino derivative, the anhydride (3a) is condensed with a primary diamine of the formula IX, for example with neopentanediamine, or in the case of compounds where A is a radical of the formula III with an imidazole. The incorporation of the imino function into a 5- or 6-membered ring and in the case of neopentanediamine the geminal methyl groups ensure in the process a surprisingly high stability of the otherwise labile imino function to hydrolysing reagents.

If, in the condensation with neopentanediamine, the reaction is carried out and worked up in the usual manner, the product is surprisingly not the expected imine but an oxidation product (5a) which is likewise strongly fluorescent. The initially expected amidine imide (4a), by contrast, is obtained when the condensation is carried out under argon as a protective atmosphere and the crude reaction solution is directly worked up by chromatography.

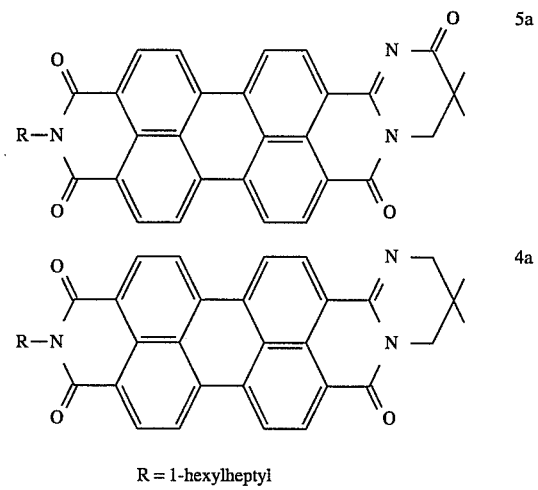

R = 1-hexylheptyl

Dyes of the formula I absorbing at longer wavelength are obtained on further extending the chromophoric system of the amidine-imide dyes. This can be done for example through a condensation of the anhydride-imide (3a) with o-phenylenediamine to form the dye (6a) or through a condensation with 1,8-diaminonaphthalene to give the dye (7a).

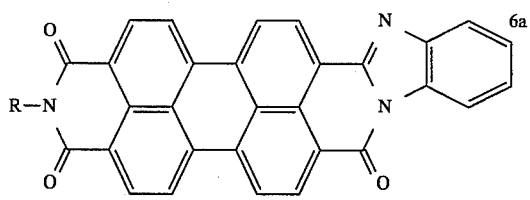

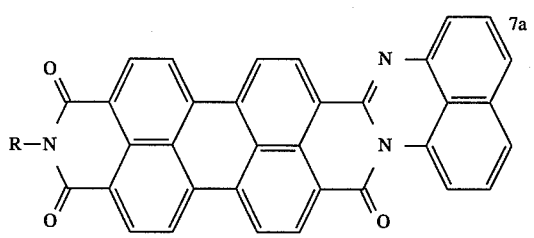

R = 1-hexylheptyl

By reacting the anhydride-imide (3a) with imidazole in the presence or absence of an amine, e.g. trisethylmethylamine or ethyldiisopropylamine, it is possible to synthesize a novel type of amidine-imide dye, 8a, in which case the imidazole group is transferred. This product cannot be prepared through a direct condensation with the corresponding primary diamine, since (Z)-1,2-diaminoethylene is not known.

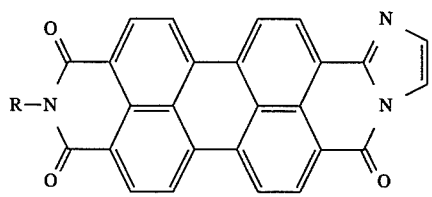

R = 1-hexylheptyl

Of the compounds of the formula I according to the invention, preference is given to those where $R_1$ is —CH($R_{10}$)$_2$ and $R_{10}$ is $C_4$–$C_{18}$alkyl, preferably $C_6$–$C_{10}$alkyl, or where $R_1$ is a radical of the formula II where R is tert-butyl. Particular preference is given to compounds where $R_1$ is 2,5-di-tert-butylphenyl or —CH($R_{10}$)$_2$ and $R_{10}$ is a straight-chain radical, preferably n-hexyl, n-heptyl, n-octyl, n-nonyl or n-decyl.

In the preparation of the compounds of the formula I, the monoanhydride-monoimide of the formula VIII is preferably reacted with aliphatic, cycloaliphatic, aromatic or heteroaromatic diamines which produce an amidine-imide product having a five- or six-membered amidine ring. Examples of preferred diamines include 1,2-cyclopentanediamine, 1,2-cyclohexanediamine, o-phenylenediamine, 2,3- or 1,8-diaminonaphthalene, 2,3- or 3,4-diaminopyridine, 9,10-diaminophenanthrene, or diamines from which a bivalent radical of the formula IV or V is derived and also substituted or unsubstituted imidazoles, e.g. imidazole or 2-aminobenzimidazole. Particularly preferred diamines are o-phenylenediamine, 1,8-diaminonaphthalene, neopentanediamine and imidazole.

Preferred perylene amidine imides of the formula I with substitution in the perylene nucleus are those compounds where the substituents $R_2$ to $R_5$ are each independently of the others hydrogen, halogen, nitro, —$OR_8$, —$NR_8R_9$, —$NR_8COR_9$, —$SO_3R_8$ or —$SO_2NR_8R_9$ and $R_8$ and $R_9$ are each independently of the other preferably methyl, phenyl or 4-tolyl. The nucleus-substituted compounds can be prepared by generally known methods analogously to the non-substituted compounds. The substituents are preferably introduced at the level of the perylene bisimide starting material, i.e. prior to the preparation of the monoanhydride monoimide of the formula VIII. Very particular preference, however, is given to perylene amidine imides of the formula I where $R_2$ to $R_5$ are each hydrogen or the same substituent, and in particular to those where at least two, preferably all radicals $R_2$ to $R_5$ are hydrogen.

As mentioned, the amidine imide dyes of the invention are notable for their marked light fastness, so that they are of particular interest for fluorescence applications. The present invention accordingly also provides for the use of these compounds as fluorescent dyes, in particular in chemiluminescence systems, in optical light collection systems, in fluorescence-based solar collectors (see for example H. Langhals, Nachr. Chem. Tech. Lab., 1980, 28, 716), in fluorescence-activated displays (see W. Greubel, G. Baur, Elektronik, 1977, 26, 6) or in single molecule spectroscopy (see W. E. Moerner, T. Basché, Angew. Chem. 1993, 105, 537), for example for constructing optical storage systems.

A further part of the subject-matter of the present invention is their use as photoconductors in electrophotography.

The perylene amidine imides of the formula I are also highly suitable for the mass coloration of plastics. They can be used with advantage for mass colouring various polymers, for example polyolefins, polyvinyl chloride, fluoropolymers, e.g. polyfluoroethylene, polytrifluorochloroethylene or tetrafluoroethylene/hexafluoroethylene copolymer, silicone resins, but in particular engineering plastics, for example polycarbonates, polyacrylates, polymethacrylates, polystyrene, ABS, polyester, in particular polyalkylene terephthalates, such as polybutylene terephthalate (PBT) or polyethylene terephthalate (PET), polyamides, polyether ketones, polyurethanes, individually or in mixtures. Advantageously they are used in a concentration from 0.01 to 10, preferably from 0.01 to 5, % by weight, based on the polymer.

Examples of polyolefins which can be coloured with the compounds of the formula I according to the invention are high density and low density polyethylenes (HD-PE, LD-PE and LLD-PE), polyisobutylene and especially polypropylene, and also copolymers of polyolefins with, for example, polyethers, polyether ketones or polyurethanes. Preference is given to polypropylene.

The colouring is effected by the usual methods, for example by mixing a compound of the formula I or a mixture of such compounds with the plastics granules or powder without having to incorporate it beforehand into a preparation, and extruding the mixture as fibres, films or granules. Granules can then be formed, for example by injection moulding, into articles.

The red-fluorescing colourings obtained exhibit high cleanness and high saturation and are notable for good transparency and also for good stability, in particular to light. The invention accordingly also provides a mass coloured macromolecular organic material including a perylene amidine imide of the formula I as colorant.

The Examples which follow illustrate the invention.

EXAMPLE 1

N-(1-Hexylheptyl)perylene-3,4:9,10-tetracarboxylic 3,4-anhydride 9,10-imide (3a)

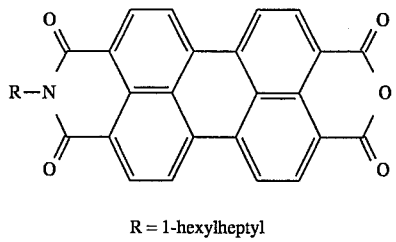

R = 1-hexylheptyl 8.00 g (10.6 mmol) of N,N'-di(1-hexylheptyl)perylene-3,4:9,10-bisdicarboximide are introduced into 50 ml of tert-butyl alcohol and the solution is heated to the boil. To this solution are then added 2.38 g (36.0 mmol) of pulverized 85 per cent KOH with stirring. After 10 min the starting material is no longer detectable by thin layer chromatography. The saponification is interrupted by adding 100 ml of glacial acetic acid, followed by 100 ml of 2N HCl. The precipitated crude red dye product is isolated by filtering the solution with suction through a D-4 frit and repeatedly washed with distilled water. To remove the coproduced perylenetetracarboxylic-3,4:9,10-bis(anhydride), the crude product is boiled up twice with 300 ml of 10 per cent potassium carbonate solution each time and filtered with suction through a D-4 frit. Drying at 100° C. for 8 h leaves 4.5 g (74%) of crude product which is freed of small residues of the starting material and further impurities by column chromatography over silica gel using 10:1 chloroform/glacial acetic acid as mobile phase. The dye fraction obtained is evaporated to dryness in a rotary evaporator and, after addition of distilled water, filtered off with suction on a D-4 frit, washed and dried. Yield: 3.8 g (63%), melting point: 330° C., $R_f$ (silica gel/CHCl$_3$)=0.52, UV (CHCl$_3$): $\lambda_{max}(\epsilon)$= 522.1 nm (81750), 486 (52760), 456.4 (23740). Fluorescence (CHCl$_3$) $\lambda_{max}$=528 nm, 570.

| $C_{37}H_{35}NO_5$ (573.7) | Calculated | C 77.46 | H 6.15 | N 2.44 |
|---|---|---|---|---|
| | Found | C 77.46 | H 5.96 | N 2.49 |

EXAMPLE 2

N-(1-Heptyloctyl)perylene-3,4:9,10-tetracarboxylic 3,4-anhydride 9,10-imide (3a)

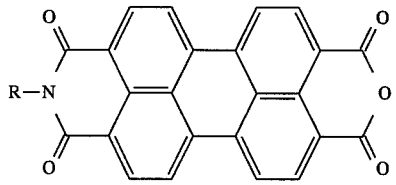

R = 1-heptyloctyl 4.05 g (5.00 mmol) of N,N'-di(1-heptyloctyl)perylene-3,4:9,10-bis(dicarboximide) are dissolved in 100 ml of tert-butyl alcohol and then admixed by stirring with 1.68 g (25.4 mmol) of 85 per cent pulverized potassium hydroxide. The reaction mixture is heated to the boil and the progress of the saponification is monitored by thin layer chromatography (silica gel/CHCl$_3$). The reaction is discontinued after 12 min by adding 120 ml of glacial acetic acid with ice-cooling. The starting material is no longer detectable by thin layer chromatography. After addition of 50 ml of 2N HCl the batch is filtered with suction through a D-4 frit and the reddish brown solid is washed neutral with distilled water. To separate off coproduced perylenetetracarboxylic bisanhydride, the crude product is twice boiled up with 200 ml of 10 per cent potassium carbonate solution each time and then filtered with suction through a D-4 frit. The crude product obtained is dried at 100° C. for 8 h. Yield 1.7 g (56%). The crude product is purified by column chromatography (80× 4 cm) over silica gel using 10:1 chloroform/glacial acetic acid as mobile phase. Traces of impurities can be removed by renewed column chromatography over silica gel using 10:1 chloroform/triethylamine as mobile phase. The isolated dye fraction is admixed with glacial acetic acid and concentrated in a rotary evaporator, and the precipitated dye is washed with water and dried for 8 h at 80° C. in an oil pump vacuum. Yield 1.44 g (48%), melting point 316° C., $R_f$ (silica gel/CHCl$_3$)=0.44, $R_f$ (10:1 silica gel/CHCl$_3$/glacial acetic acid)=0.85. UV (CHCl$_3$): $\lambda_{max}(\epsilon)$=455 nm (17350), 485 (46260), 522 (70380). Fluorescence (CHCl$_3$): $\lambda_{max}$=528 nm, 570.

| $C_{39}H_{39}NO_5$ (601.7) | Calculated | C 77.84 | H 6.53 | N 2.33 |
|---|---|---|---|---|
| | Found | C 78.04 | H 6.64 | N 2.54 |

EXAMPLE 3

N(1-Octylnonyl)perylene-3,4:9,10,-tetracarboxylic 3,4-anhydride 9,10-imide (3c)

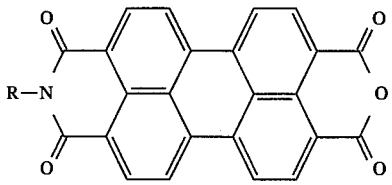

R = 1-octylnonyl 8.67 g (9.99 mmol) of N,N'-di(1-octylnonyl)perylene-3,4:9,10-bis(dicarboximide) are dissolved in 100 ml of tert-butyl alcohol by heating. 2.24 g (33.9 mmol) of pulverized 85% KOH are introduced into the solution which has been brought to the boil, and the reaction mixture is maintained at the boil for 12 min with stirring. The saponification is then discontinued by adding 100 ml of glacial acetic acid and 100 ml of 2N HCl with ice-cooling. The resulting red precipitate is, after addition of 200 ml of distilled water, filtered off with suction on a D-4 frit, washed neutral and twice boiled up with 200 ml of 10 per cent potassium carbonate solution each time and filtered off with suction. The precipitate is dried at 100° C. for 8 h. Yield 4.15 g (66%) of crude product. For further purification the crude product is chromatographed over silica gel (column 80×4 cm) using 10:1 CHCl$_3$/glacial acetic acid. To achieve elemental analysis purity, the dye obtained is rechromatographed using 10:1 CHCl$_3$/triethylamine as mobile phase. Yield: 3.68 g (58%), melting point 312° C., $R_f$ (silica gel/CHCl$_3$)=0.36, $R_f$ (10:1 silica gel/CHCl$_3$/glacial acetic acid)=0.66. UV (CHCl$_3$): $\lambda_{max}(\epsilon)$=456 nm (18670), 485 (46850), 521 (75710). Fluorescence (CHCl$_3$): $\lambda_{max}$=528 nm, 570.

| C₄₁H₄₃NO₅ (629.7) | Calculated | C 78.18 | H 6.88 | N 2.22 |
| --- | --- | --- | --- | --- |
| | Found | C 77.84 | H 6.84 | N 2.24 |

EXAMPLE 4

N-(1-Nonyldecyl)perylene-3,4:9,10-tetracarboxylic-3,4-anhydride-9,10-imide (3d)

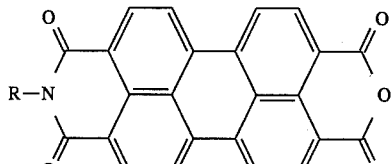

R = 1-nonyldecyl 923 mg (1.00 mmol) of N,N'-(1-nonyldecyl)perylene-3,4:9,10-tetracarboxylic bis(imide) are dissolved in 50 ml of tert-butyl alcohol by heating and admixed with 225 mg (3.41 mmol) of 85 per cent pulverized KOH by stirring. The solution is heated to the boil and the course of the saponification is monitored by thin layer chromatography. After 13 min the starting material is no longer detectable. The reaction is discontinued by adding 50 ml of glacial acetic acid and 50 ml of 2N HCl with ice-cooling. The reddish brown precipitate is filtered with suction on a D-4 frit, washed neutral with distilled water and dried at 100° C. for 8 h. Yield 620 mg (94.1%) of crude product. The further purification is carried out analogously to N-(1-heptyloctyl)perylene-3,4:9,10-tetracarboxylic 3,4-anhydride 9,10-carboximide, Yield 330 mg (50.1%), melting point 308° C. R_f (silica gel/CHCl₃)=0.77, R_f (10:1 silica gel/CHCl₃/glacial acetic acid)=0.85. UV (CHCl₃): λ_max(ε)=455 nm (20690), 486 (48920), 522 (77990). Fluorescence (CHCl₃): λ_max=528 nm, 870.

| C₄₃H₄₇NO₅ (657.8) | Calculated | C 78.51 | H 7.20 | N 2.13 |
| --- | --- | --- | --- | --- |
| | Found | C 78.53 | H 7.14 | N 2.24 |

EXAMPLE 5

N-(1-Decylundecyl)perylene-3,4:9,10-tetracarboxylic 3,4-anhydride 9,10-imide (3e)

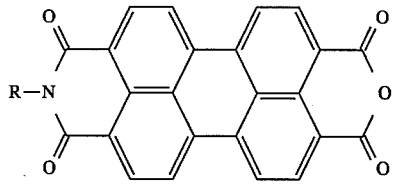

R = 1-decylundecyl 4.98 g (5.00 mmol) of N,N'-di(1-decylundecyl)perylene-3,4:9,10-tetracarboxylic bis-(imide) are dissolved in 100 ml of tert-butyl alcohol and admixed with 1.12 g (17.0 mmol) of pulverized 85 per cent KOH by stirring. The solution is heated to the boil and the course of the saponification is monitored by thin layer chromatography. After 12 min the reaction is discontinued by adding 150 ml of glacial acetic acid with ice-cooling. The further purification is carried out analogously to N-(1-heptyloctyl)perylene-3,4:9,10-tetracarboxylic 3,4-anhydride 9,10-imide. Yield 1.95 g (57%), melting point 302° C., R_f (silica gel/CHCl₃)=0.80, R_f (10:1 silica gel/CHCl₃/glacial acetic acid)=0.85. UV (CHCl₃): λ_max(ε)=455 nm (18470), 486 (47840), 522 (77690). Fluorescence (CHCl₃): λ_max=528 nm, 870.

| C₄₅H₅₁NO₅ (685.8) | Calculated | C 78.81 | H 7.49 | N 2.04 |
| --- | --- | --- | --- | --- |
| | Found | C 78.76 | H 7.46 | N 2.18 |

EXAMPLE 6

12-(Hexylheptyl)-38,3-dimethylpyrimido[2,1-a]anthra[2,1,9-def:6,5,10-d'e'f']-diisoquinoline-2,6,11,13(3H,4H,12H)-tetrone (5a)

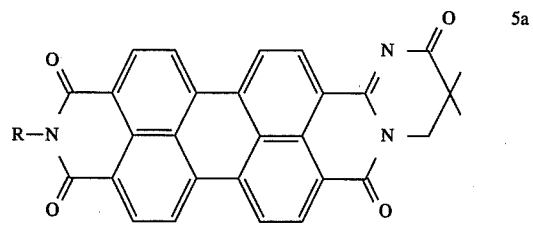

R = 1-hexylheptyl 2.00 g (3.49 mmol) of N-(1-Hexylheptyl)perylene-3,4:9,10-tetracarboxylic 3,4-anhydride 9,10-imide are heated with 10.4 g (102 mmol) of neopentanediamine and 10.0 g of imidazole under exclusion of carbon dioxide (KOH) in an argon-flushed apparatus at 180° C. for 90 min. After a short period the colour changes to blackish violet. The reaction mixture, after cooling down, is rinsed with 100 ml of ethanol from the reaction vessel and then admixed with 100 ml of 2N hydrochloric acid. The mixture is stirred at room temperature for at least 1 h and then the fine, brownish violet, almost black, precipitate is filtered off with suction and air-dried at 130° C. for 12 h. Yield 2.14 g (95%). Thin layer chromatography (silica gel, 10:1 chloroform/glacial acetic acid) detects in addition to the starting material (R_f=0.89) and a yellowish orange fluorescent compound, three reddish orange fluorescent products having the R_f values 0.00, 0.25 and 0.83. Column chromatography (silica gel, 10:1 chloroform/glacial acetic acid) is then used to isolate the product having the R_f value of 0.83 and chromatograph it once more with 40:1 chloroform/1-butanol. The eluate is filtered through a D5 glass frit and, after the solvent has been evaporated off, dried at 130° C. Yield 1.36 g (60%), melting point>360° C., R_f (silica gel, 10:1 CHCl₃/glacial acetic acid)=0.83.

| C₄₂H₄₃-N₃O₄ (653.8) | Calculated | C 77.16 | H 6.63 | N 6.43 | O 9.79 |
| --- | --- | --- | --- | --- | --- |
| | Found | C 77.41 | H 6.67 | N 6.28 | O 9.75 |

EXAMPLE 7

12-(Hexylheptyl)-3,3-dimethylpyrido[2,1-a]anthra[2,1,9-def:6,5,10-d'e'f']-diisoquinoline-6,11,13(2H,3H,4H,12H)-trione (4a)

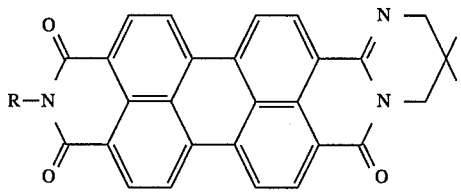

R = 1-hexylheptyl 2.00 g (3.49 mmol) of N-(1-hexylheptyl)perylene-3,4:9,10-tetracarboxylic 3,4-anhydride 9,10-imide are heated with 10.4 g (102 mmol) of neopentanediamine and 10.0 g of imidazole analogously to 5a under exclusion of air (argon as protective atmosphere) at 180° C. for 90 min. After a short time the colour changes to blackish violet. An immediately taken sample reveals the same products as in the case of 5a, but in different proportions. Without workup with ethanol/HCl, the crude batch is chromatographed over a silica gel column using 10:1 chloroform/glacial acetic acid. The first three fractions are discarded and the red product having an $R_f$ value of 0.25 is isolated and air-dried at 130° C. Yield 220 mg (10%), melting point>310° C., $R_f$ (silica gel, 10:1 CHCl$_3$/glacial acetic acid)=0.25. UV (CHCl$_3$): $\lambda_{max}$=538 nm, 501, 469. Fluorescence (CHCl$_3$): $\lambda_{max}$=559 nm, 591. MS (70 eV): m/z (%)=639 (46) [M$^+$].

EXAMPLE 8

13-(1-Hexylheptyl)benz[3,4]imidazolo[2,1-a]anthra[2,1,9-def:6,5,10-d'e'f']diisoquinoline-7,12,14(13H)-trione (6a)

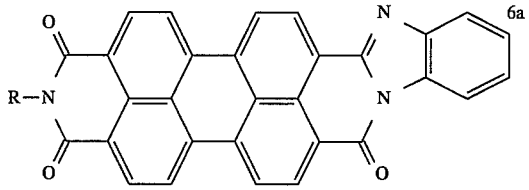

R = 1-hexylheptyl 1.00 g (1.74 mmol) of N-(1-hexylheptyl)-3,4:9,10-tetracarboxylic 3,4-anhydride 9,10-imide, 5.00 g (46.2 mmol) of 1,2-diaminobenzene, and 5.00 g of imidazole are heated for 2 h at 180° C. under carbon dioxide exclusion in an argon-flushed apparatus. The solid, blackish brown reaction product is suspended in 150 ml of ethanol and the resulting, blackish brown suspension is admixed with 100 ml of 2N hydrochloric acid and stirred at room temperature for 1 h. This is followed by a filtration with suction and the violet-brown solid is dried at 130° C. for 16 h. Yield 1.07 g (88%). The crude product, in addition to the pink-fluorescing reaction product (having an $R_f$ value of 0.88 (chloroform/silica gel), contains the starting material ($R_f$=0.89) and a brown, non-fluorescent by-product having an $R_f$ value of 0.00. To isolate the main product, the crude product is chromatographed over silica gel using 10:1 chloroform/glacial acetic acid and then 40:1 chloroform/butanol. The main fraction of the second elution is concentrated, and the dye crystallizes from butanol in shiny, reddish violet needles. The crystals are filtered off with suction, washed repeatedly with distilled water and dried at 130° C. Yield 840 mg (74%), melting point>360° C., $R_f$ (10:1 CHCl$_3$/glacial acetic acid)=0.88. UV (CHCl$_3$): $\lambda_{max}(\epsilon)$=571 nm (57360), 535 (50820), 504 (26760). Fluorescence (CHCl$_3$): $\lambda_{max}$=602 nm.

| C$_{43}$H$_{39}$N$_3$O$_3$ (645.8) | Calculated | C 79.97 | H 6.09 | N 6.57 |
|---|---|---|---|---|
| | Found | C 79.66 | H 6.02 | N 6.53 |

EXAMPLE 9

15-(1-Hexylheptyl)perimidino[2,1-a]anthra[2,1,9-def:6,5,10-d'e'f']diisoquinoline-9,14,16(15H)-trione (7a)

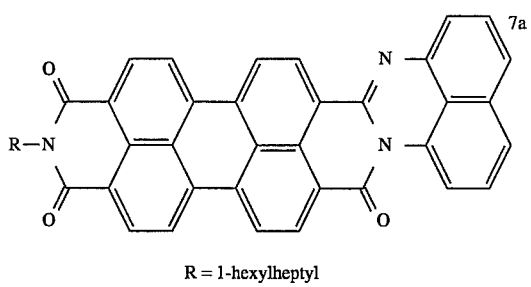

R = 1-hexylheptyl 1.00 g (1.74 mmol) of N-(1-hexylheptyl)-3,4:9,10-perylenetetracarboxylic 3,4-anhydride 9,10-imide (3a) are heated to 160° C. with 10.0 g (63.2 mmol) of 1,8-naphthalenediamine, 30 ml of freshly distilled quinoline and 330 mg of zinc acetate in an argon-flushed apparatus. After 30 min the reaction mixture foams up violently and forms a gooey coating at the surface. After a further 30 min the mixture has turned deep violet. The reaction mixture is heated at 160° C. for a further hour and, after cooling down, the gooey mass is suspended in 300 ml of ethanol and stirred at room temperature for 16 h. The black precipitate is filtered off with suction, washed with ethanol until the quinoline odour has disappeared, and then dried at 130° C. Yield 1.15 g (94%). The thin layer chromatogram of this product (silica gel, 10:1 chloroform/glacial acetic acid) reveals, in addition to the starting material, a blue, smudged zone. To remove the starting material, its good solubility in chloroform/glacial acetic acid mixtures is utilized, given that the solubility of the reaction product decreases with increasing glacial acetic acid content. The crude product is repeatedly digested with 1 l of 10:1 chloroform/glacial acetic acid each time and then filtered off. 800 ml of chloroform are distilled out of the solution and the remainder is left to stand at room temperature for 16 h. The violet-blue dye which crystallizes out in tiny needles is filtered off with suction on a D4 glass frit, repeatedly washed with distilled water and dried at 130° C. This procedure is repeated until all the crude product has been dissolved. Yield: 320 mg (26%), melting point>360° C., $R_f$ (Al$_2$O$_3$/CHCl$_3$)=0.95. UV (CHCl$_3$): $\lambda_{max}$=604 nm, 542, 507.

| C$_{47}$H$_{41}$N$_3$O$_3$ (695.9) | Calculated | C 81.13 | H 5.94 | N 6.04 |
|---|---|---|---|---|
| | Found | C 79.90 | H 5.85 | N 6.03 |

EXAMPLE 10

11-(1-Hexylheptyl)imidazolo[2,1-a]anthra[2,1,9-def:6,5,10-d'e'f']diisoquinoline-5,10,12(11H)-trione (8a)

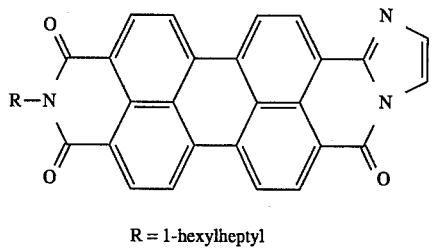

R = 1-hexylheptyl 0.5 g of N-(1-hexylheptyl)-perylene-3,4:9,10-tetracarboxylic 3,4-anhydride 9,10-imide are thoroughly mixed with 0.77 g of trisethylmethylamine (freshly distilled) and 0.8 g of imidazole and introduced into an autoclave tube. The reaction mixture is heated in the autoclave at 170° C. for 4 h. After the autoclave has cooled down overnight to room temperature, it is opened, and the product mixture is dissolved out with 200 ml of boiling ethanol. 400 ml of 2N HCl are added to precipitate the product. To complete the precipitation, the mixture is stirred at room temperature for 1 h, and the reddish violet precipitate is then filtered off with suction on a D4 glass filter frit and then dried at 110° C. for 8 h. 0.48 g of a reddish violet powder are obtained as crude product. For the first separation 0.2 g of the crude product is dissolved in a little chloroform and separated by column chromatography over alumina (neutral) using 10:1 chloroform/glacial acetic acid. In addition to other, unidentified products and unconverted monoanhydride-monoimide, a strongly fluorescing main product is isolated and it is ultrapurified over silica gel using (10:1) chloroform/glacial acetic acid. Yield 0.12 g (24%) of a blackish violet powder.

$R_f$ (silica gel/CHCl$_3$)=0.01/$R_f$, (CHCl$_3$/glacial acetic acid 10:1)=0.47, UV (CHCl$_3$: $\lambda_{max}$=487 nm, 520, 560, MS (70 eV): m/z (%)=595.3(15)[M$^+$]. On the basis of these data and on the basis of the IR, $^1$H-NMR and $^{13}$C-NMR, the product can be identified as compound 8a.

| $C_{39}H_{37}N_3O_3$ (595.7) | Calculated | C 78.63 | H 6.26 | N 7.05 |
|---|---|---|---|---|
| | Found | C 78.71 | H 6.38 | N 6.86 |

EXAMPLE 11

15-(1-Hexylheptyl)naphtho[3,2-d]-imidazolo[3,2-a]anthra[2,1,9-def:6,5,10-d'e'f']diisoquinoline-9,14,16(15H)-trione

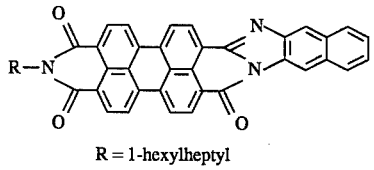

R = 1-hexylheptyl 1.00 g (1.74 mmol) of N-(1-hexylheptyl)-3,4:9,10-perylenetetracarboxylic 3,4-anhydride 9,10-imide (3a) and 0.66 g (4.20 mmol) of 2,3-diaminonaphthalene are stirred at 160° C. in 10.0 g of imidazole for 1 h. The still liquid residue is flushed with 200 ml of ethanol from the reaction vessel and, to remove excess amine, admixed with 100 ml of 2N hydrochloric acid. The mixture is stirred at room temperature for 1 h, and the resulting violet-black precipitate is filtered off with suction on a D4 glass frit and dried. Purification is by column chromatography over silica gel using 10:1 chloroform/glacial acetic acid as mobile phase, eluting the product as a violet band. After removal of the solvent, the dye is rechromatographed under the same conditions, the solvent is removed in a rotary evaporator, and the residue is dried in vacuo. Yield 0.67 g (55%), melting point>300° C., $R_f$ (CHCl$_3$/glacial acetic acid 10:1)=0.57. UV (CHCl$_3$): $\lambda_{max}$=567 nm, 538, 383, 363; Fluorescence (CHCl$_3$): $\lambda_{max}$=652 nm,

| $C_{47}H_{41}N_3O_3$ (695.9) | Calculated | C 81.13 | H 5.94 | N 6.04 |
|---|---|---|---|---|
| | Found | C 80.92 | H 5.98 | N 6.14 |

EXAMPLE 12

17-(1-Hexylheptyl)anthra-9,10-dione[2,1-d]-imidazolo[3,2-a]anthra[2,1,9-def:6,5,10-d'e'f']diisoquinoline-11,16,18(17H)-trione

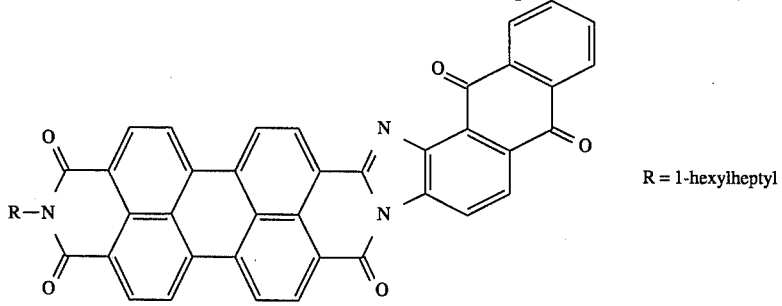

R = 1-hexylheptyl 0.20 g (0.34 mmol) of N-(1-hexylheptyl)-3,4:9,10-perylenetetracarboxylic 3,4-anhydride 9,10-imide (3a) and 0.19 g (0.82 mmol) of 1,2-diaminoanthraquinone are stirred at 160° C. in 2.0 g of imidazole for 1 h. The still liquid residue is flushed with 80 ml of ethanol from the reaction vessel and, to remove excess amine, admixed with 40 ml of 2N hydrochloric acid. The mixture is stirred at room temperature for 1 h, and the resulting precipitate is filtered off with suction on a D-4 glass frit and dried. Purification is by column chromatography over silica gel using 10:1 chloroform/glacial acetic acid as mobile phase, eluting the product as a violet band. After removal of the solvent, the dye is chromatographed twice over silica gel using 40:1 chloroform/n-butanol. Finally it is extractively recrystallized from toluene. Yield 0.13 g (51%); melting point>300° C.; $R_f$ (CHCl$_3$/n- butanol 40:1)=0.43; UV (CHCl$_3$): $\lambda_{max}$=574 nm, 535, 500; MS(70 eV): m/z (%)=775(6), 758(3), 593(71), 565(8), 281(10), 207(100), 191(12), 133(10).

EXAMPLE 13

18-(Hexylheptyl)phenanthro[9,10-di-imidazolo]3,2-a]anthra[2,1,9-def:6,5,10-d'e'f']diisoquiline-12,17,19(18H)-trione

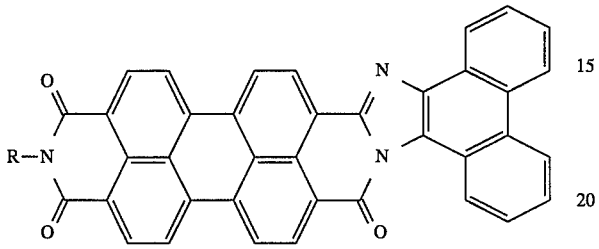

R = 1-hexylheptyl 0.20 g (0.34 mmol) of N-(1-hexylheptyl)-3,4:9,10-perylenetetracarboxylic 3,4-anhydride 9,10-imide (3a) and 0.14 g (0.82 mmol) of 9,10-diaminophenanthrene are stirred at 160° C. in 2.0 g of imidazole for 1 h. The still liquid residue is flushed with 80 ml of ethanol from the reaction vessel and, to remove excess amine, admixed with 40 ml of 2N hydrochloric acid. The mixture is stirred at room temperature for 1 h, and the resulting precipitate is filtered off with suction on a D-4 glass frit and dried. Purification is by column chromatography over silica gel using 40:1 chloroform/n-butanol as mobile phase, but it proves extremely difficult to make out the individual bands. After the dye has been chromatographed three times under these conditions, a thin layer chromatogram shows the fluorescent product and a non-fluorescent compound at the start, which cannot even be removed by renewed chromatographing under the same conditions. Yield 0.11 g (44%); melting point>300° C.; R$_f$ (CHCl$_3$/n-butanol 40:1)=0.57; UV (CHCl$_3$): $\lambda_{max}$=583 nm, 523, 359; MS(70 eV): m/z (%)=745(50), 728(6), 563(100), 518(13), 493( 7), 259(7).

What is claimed is:

1. A perylene amidine imide of the formula I

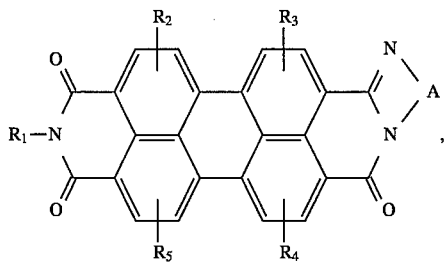

where R$_1$ is a secondary C$_7$–C$_{41}$alkyl radical or a radical of the formula II

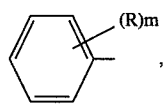

where R is a branched C$_3$–C$_8$alkyl radical and m is 1, 2 or 3;

A is C$_5$–C$_7$cycloalkylene, phenylene, naphthylene, pyridylene, a more highly fused aromatic carbocyclic or heterocyclic radical or a bivalent radical of the formula III, IV or V

 (III)

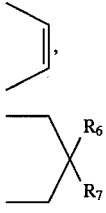 (IV)

or

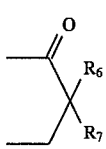 (V)

and R$_1$ and A may each be substituted by halogen, alkyl, cyano or nitro; R$_2$ to R$_5$ are each independently of the others hydrogen, alkyl, aryl, hetaryl, halogen, cyano, nitro, —OR$_8$, —COR$_8$, —COOR$_8$, —OCOR$_8$, —CONR$_8$R$_9$, —OCONR$_8$R$_9$, —NR$_8$R$_9$, —NR$_8$COR$_9$, —NR$_8$COOR$_9$, —NR$_8$SO$_2$R$_9$, —SO$_2$R$_8$, —SO$_3$R$_8$, —SO$_2$NR$_8$R$_9$ or —N=N—R$_8$; and R$_6$ to R$_9$ are each independently of the others C$_1$–C$_4$alkyl, phenyl or 4-tolyl.

2. A perylene amidine imide according to claim 1, wherein R$_1$ is —CH(R$_{10}$)$_2$ and R$_{10}$ is C$_4$–C$_{18}$alkyl, or wherein R$_1$ is a radical of the formula II where R is tert-butyl.

3. A perylene amidine imide according to claim 2, wherein R$_1$ is 2,5-di-tert-butylphenyl or —CH(R$_{10}$)$_2$ and R$_{10}$ is a straight-chain radical.

4. A perylene amidine imide according to claim 1, wherein A is 1,2-cyclopentylene, 1,2-cyclohexylene, 1,2-phenylene, 2,3- or 1,8-naphthylene, 2,3- or 3,4-pyridylene, 9,10-phenanthrylene, 1,2-anthraquinolylene or a bivalent radical of the formula III, IV or V as set forth in claim 1.

5. A perylene amidine imide according to claim 1, wherein A is 1,2-phenylene, 2,3- or 1,8-naphthylene, 9,10-phenanthrylene, 1,2-anthraquinolylene or a bivalent radical of the formula III, VI or VII

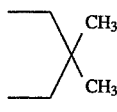 (VI)

or

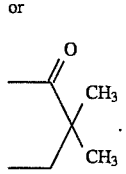 (VII)

6. A perylene amidine imide according to claim 1, wherein R$_2$ to R$_5$ are each independently of the others hydrogen, halogen, nitro, —OR$_8$, —NR$_8$R$_9$, —NR$_8$COR$_9$, —SO$_3$R$_8$ or —SO$_2$NR$_8$R$_9$ and R$_8$ and R$_9$ are each independently of the other methyl, phenyl or 4-tolyl.

7. A perylene amidine imide according to claim 1, wherein R$_2$ to R$_5$ are each hydrogen or the same substituent.

8. A perylene amidine imide according to claim 1, wherein at least two radicals R$_2$ to R$_5$ are hydrogen.

9. A process for preparing a perylene amidine imide according to claim 1 by reacting a perylene-3,4:9,10-tetracarboxylic monoanhydride monoimide of the formula VIII

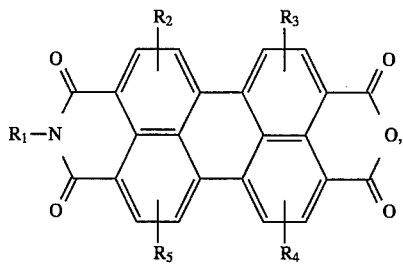

with a primary diamine of the formula IX

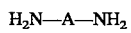  (IX), where, in the formulae VIII and IX, $R_1$ and A are each as defined in claim 1, with the proviso that A is not a radical of the formula III.

10. A process for preparing a perylene amidine imide according to claim 1 where A is a radical of the formula III by reacting a substituted or unsubstituted imidazole with a perylene-3,4:9,10-tetracarboxylic monoanhydride monoimide of the formula VIII

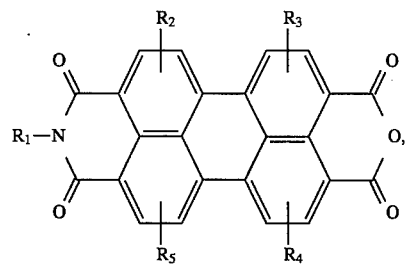

where $R_1$, in the formula VIII, is as defined in claim 1.

11. A mass coloured macromolecular organic material including as colorant a perylene amidine imide according to claim 1.

12. A method of use of the perylene amidine imide of claim 1 as a fluorescent dye in chemiluminescence systems, in optical light collection systems, in fluorescence-based solar collectors, in fluorescence-activated displays or in single molecule spectroscopy.

13. A method of use of the perylene amidine imide of claim 1 as a photoconductor in electrophotography.

* * * * *